United States Patent
Trinh et al.

(10) Patent No.: US 6,954,051 B2
(45) Date of Patent: Oct. 11, 2005

(54) BATTERY CHARGER AND CHARGING METHOD

(75) Inventors: Danh T. Trinh, Towson, MD (US); Paul S. White, Ellicott City, MD (US); Daniele C. Brotto, Baltimore, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 10/888,642

(22) Filed: Jul. 9, 2004

(65) Prior Publication Data

US 2004/0257049 A1 Dec. 23, 2004

Related U.S. Application Data

(63) Continuation of application No. 10/349,834, filed on Jan. 23, 2003, now Pat. No. 6,791,300.
(60) Provisional application No. 60/360,402, filed on Feb. 28, 2002.

(51) Int. Cl.[7] .................................................. H02J 7/04
(52) U.S. Cl. ....................................................... 320/145
(58) Field of Search ................................. 320/145, 107, 320/128, 130, 139, 141, 151

(56) References Cited

U.S. PATENT DOCUMENTS

| | | | | |
|---|---|---|---|---|
| 5,633,574 A | * | 5/1997 | Sage | 320/107 |
| 5,998,968 A | * | 12/1999 | Pittman et al. | 320/130 |
| 6,130,522 A | * | 10/2000 | Makar | 320/141 |
| 6,154,011 A | * | 11/2000 | Lam et al. | 320/139 |
| 6,242,889 B1 | * | 6/2001 | Belyo | 320/128 |
| 6,791,300 B2 | * | 9/2004 | Trinh et al. | 320/151 |

* cited by examiner

Primary Examiner—Pia Tibbits
(74) Attorney, Agent, or Firm—Adan Ayala

(57) ABSTRACT

The charging method includes the steps of charging a battery pack, sensing voltage of the battery pack, calculating voltage change rate, detecting a first inflection point based on the voltage change rate so long as a voltage step is not detected, detecting a second inflection point based on the voltage change rate so long as a voltage step is not detected, and reducing current sent to the battery pack when both first and second inflection points have been detected.

9 Claims, 4 Drawing Sheets

BATTERY CHARGER AND CHARGING METHOD

CROSS-REFERENCE TO RELATED APPLICATION

The present application is a continuation of U.S. application Ser. No. 10/349,834, filed on Jan. 23, 2003, now U.S. Pat. No. 6,791,300, which in turn derives priority under 35 USC §119(e) from U.S. application Ser. No. 60/360,402, filed on Feb. 28, 2002, now abandoned.

FIELD OF THE INVENTION

This invention relates generally to battery chargers and charging methods.

BACKGROUND OF THE INVENTION

The battery packs for portable power tools, outdoor tools and certain kitchen and domestic appliances may include rechargeable batteries, such as lithium, nickel cadmium, nickel metal hydride and lead-acid batteries, so that they can be recharged rather than be replaced. Thereby a substantial cost saving is achieved.

Nevertheless, problems are still encountered by the user. Frequently, the user discovers that the batteries have self-discharged and need recharging at exactly the moment when the user would like to use the device, and recharging in most instances takes an inconveniently long period of time.

One solution to this is to provide maintenance charging systems in which the battery can be left on constant charge between uses. Even this system is of no value if the user fails to put the battery back on charge after use; in addition, most maintenance charging systems actually cause slow deterioration of the battery with time.

The solution to all of the above problems would be the provision of an adequate fast charging system which would reliably bring the battery up to its full state of charge in the shortest possible time and without risk of damage. While the prior art is replete with attempts to provide good fast charging systems, no satisfactory system has yet been developed. Most fast charging systems today require very special conditions, such as unusually expensive batteries which can accept the output of the fast charge system. Even under these special conditions, there remains a risk of serious damage to either the battery or to the charger. In addition, the present fast charge techniques do not properly charge the batteries. Depending on the termination mode used, all fast charge techniques of which we are aware either overcharge or under charge the battery, either of which causes gradual deterioration of the battery and premature failure.

In part, the failures of the prior art have been due to the inability to accurately indicate full battery charge; this has been due either to the failure of the prior art to select the proper mode of indication, or to the fact that, even if a reasonably good indicator has been selected, the charging requirements of a battery vary substantially with individual cell chemistry, with individual cell history and with ambient temperature. Thus, even an indication mode which is reasonably well selected for a particular battery type may actually provide an accurate indication only for a few cells having ideal characteristics and only if the cells are charged under proper conditions of ambient temperature.

For example, a major category of previous fast charging systems has relied upon temperature cutoff to terminate the fast charge mode. However, these systems are subject to several difficulties: they may damage the batteries due to the constant repetition of high temperature conditions, even in specially manufactured (and expensive) cells which are theoretically designed to accept high temperatures; such systems may not be safe for use with defective cells; they actually do not charge a battery to its full capacity, in high ambient temperature conditions; the charge efficiency is low and the systems are therefore wasteful; and in low ambient temperature, the battery may be driven to self-destruct by venting or possibly explosion.

Another major category of prior art fast charging systems relies on voltage cutoff. However, in many types of battery systems including nickel-cadmium, this termination mode is unreliable due to the large voltage variation which can occur with temperature, or due to cell history or individual cell characteristics. Thus, a voltage cutoff system can destroy a battery through venting. Except in unusual ideal conditions, it will never properly charge a battery to its full capacity.

A third major category of prior art battery charging termination is based on simple passage of time. However, the accuracy of this system depends on the battery, at the beginning of charge, having an assumed state of charge. There is a very high likelihood that this will not be the case and that the battery will be either over or under charged.

Most other charging methods which have been used to date are based on combinations of one or more of the above techniques. While some problems can be avoided by these combinations, at least some of them still exist. Even the best fast charge systems require expensive cell constructions; but the additional cost only serves to delay the battery deterioration which is caused by the charging system.

A more recent technique, illustrated by U.S. Pat. No. 4,052,656, seeks the point at which the slope of the voltage-versus-time curve for a given battery is zero. However, even this technique is subject to difficulties; it may detect another point at which the voltage slope is zero but at which the battery is only partially charged; in addition, even if it properly locates the zero slope point which is close to full charge, this inherently overcharges the battery and will cause battery deterioration due to heating.

Typically, most battery charging systems embody one or another of the above techniques and are subject to one or more of the above-listed defects. This is true despite the fact that most currently known battery chargers are designed to be used with only one type of battery and, in general, with only one selected number of battery cells of that particular type. The concept of a battery charger which can accurately and rapidly deliver full charge to a variety of different batteries including different number of cells or different types of battery couples is totally beyond the present state of the battery charging art.

U.S. Pat. Nos. 4,392,101 and 4,388,582 (hereinafter "the Saar Patents") disclosed a solution to these problems. In particular, the Saar Patents disclosed a new method based on the inflection points of the charging curve.

In the course of recharging a nickel-cadmium battery, it has been found that a very typical curve is produced if the increasing battery voltage is plotted as function of time. FIG. 1 is a representation of a typical curve of this type, as taken during a constant current charging cycle. A similarly typical curve can be obtained by plotting current against time during a constant voltage charging cycle, and a reproducible pattern also occurs if neither voltage nor current are held constant This curve may be divided into significant regions, as indicated by the Roman numerals between the vertical lines superimposed on the curve. While the curve is subject to variations in specific values of voltage or of time, the general form is similar for all nickel-cadmium batteries including one or more cells, and the following discussion applies equally to all such batteries.

Region I of FIG. 1 represents the initial stage of voltage change which occurs when the charging cycle is first started. In this Region, the voltage is subject to significant variations based on the initial charge level of the battery, its history of charge or discharge, etc. Since the shape of this Region can vary, it is indicated in FIG. 1 by a dotted line.

Because the information in Region I varies, it may be preferable to ignore this segment of the curve. The battery will generally traverse Region I completely within the first 30 to 60 seconds of charging and enter Region II; in general, the voltage in the Region I and period increases relatively rapidly from the initial shelf voltage and the short peaks which may occur in this Region are not harmful.

As the battery approaches a more stable charging regime, it enters the portion of the curve designated Region II. Region II may be of fairly long duration with little or no increase in voltage. During this time, most of the internal chemical conversion of the charging process takes place. When significant portions of the active material have been converted, the battery begins to approach full charge and the voltage begins to increase more rapidly. The inflection point A in the curve from a decreasing rate of voltage increase to an increasing rate of voltage increase is identified as the transition from Region II to Region III.

Region III is characterized by a relatively rapid voltage increase as more and more of the active material is converted to the charged state. As the battery approaches full charge more closely, that is, when perhaps 90 to 95% of its active material has been converted chemically, oxygen begins to evolve. This produces an increase in the internal pressure and also an increase in the temperature of the cell. Due to these effects, the rapid increase in battery voltage begins to slow and another inflection point occurs in the curve. This second inflection point is identified as the transition point between Regions III and IV, point B.

Within Region IV, the final portions of the active material are being converted to the chemical composition of the fully charged battery. At the same time, due to oxygen evolution from material already converted, the internal pressure increase and the heating contribute to a slowing in the rate of voltage increase until the voltage stabilizes at some peak value for a short period of time. This is designated as the transition between Regions IV and V.

Within Region V, if charging is continued, the voltage of the cell starts to decrease due to additional heating as virtually all of the applied energy is converted into heat and the negative temperature coefficient of the battery voltage causes the voltage to decrease. Continued application of charging energy in this Region would eventually cause damage to the battery, either through venting or damage to the separator.

As previously noted, the relative time duration, slope or value of any portion of this curve may be modified by such factors as the initial temperature of the battery, the charge or discharge history of the battery, the particular manufacturing characteristics and the individual characteristics of the battery cell. However, the major aspects of this curve and of each of its Regions will be identifiable in any non-defective nickel-cadmium battery which is brought from a substantially discharged state to a fully charged state at a constant, relatively high current.

The charging method disclosed in the Saar Patents basically involves identifying exactly the conditions in the particular battery undergoing charge and correspondingly controlling the application of charge current. As applied specifically to nickel-cadmium batteries, the method of the Saar Patents involves the identification of the inflection point between Regions II and III and by the identification of the subsequent or following inflection point between Regions III and IV. Once these two inflection points have been identified and it has been confirmed that their occurrence is in exactly that order, and only then, the battery charging current can be discontinued or reduced to a maintenance or topping mode if desired, with absolute assurance that the battery has been brought to a full state of charge regardless of its temperature, history, or individual cell characteristics. Because of the accuracy of this determination, this method can even be applied to batteries which are constructed for use only with trickle chargers.

The Saar Patents also disclosed identifying the changes of sign of the second derivative of the voltage with respect to time. Specifically, Region II is characterized by the gradual decrease of the slope or rate of charge of voltage versus time. For a fully discharged battery, Region II constitutes the largest portion of the charging period with voltage over most of this period increasing at a relatively low rate. As the battery approaches full charge, the voltage again starts to increase somewhat more rapidly. Thus, the slope which had been becoming progressively smaller and smaller starts to become larger again. This can be described as an inflection point or a change in sign of the second derivative of voltage with respect to time. Thus, we have a first such change in sign giving indication that the battery is nearing the full charge state.

During Region III the slope of the voltage-time curve increases further and further as the battery comes closer to full charge. At or near the full charge point, there is the transition between Regions III and IV at which the slope of voltage stops increasing and starts decreasing to smaller and smaller values as Region IV progresses. Here again, a change in the sign of the second derivative of the voltage-time curve occurs. This decreasing slope in Region IV indicates that virtually all of the active material in the cell has been changed to the charged state and that the energy going into the cell is beginning to convert into heat rather than continuing the charging process. Thus it is desirable to terminate charge during the early or middle part of Region IV of the voltage time curve.

These two above described changes in sign of the second derivative of the voltage-time curve are characteristic of nickel-cadmium and other electrochemical cells during the charging process. They provide a unique and reliable indication of the state of charge of the battery. A particularly important aspect of the method of the Saar Patents is, accordingly, the use of these observable changes of sign of the second derivative of the voltage-time curve to determine when to terminate battery charging.

However, the Saar Patents are not a panacea. Indeed, the Saar Patents note that: "In some cases, the inflection point technique which is appropriate for normal conditions may not be adequate, for example, if a battery is damaged or defective or if a user inadvertently places a fully charged battery on charge."

One possible situation is when a "sleeper" cell in a battery pack "wakes up" sometime after the charging process has started. When this occurs, the battery charger will note a sudden increase in the battery voltage, otherwise known as a "voltage step" C, as shown in FIG. 2.

In such circumstance, the charger may interpret the beginning of voltage step C, i.e., point CP1, as the first inflection point, i.e., the point where a decreasing rate of voltage increase changes to an increasing rate of voltage increase. Furthermore, the charger may interpret the end of voltage step C, i.e., point CP2, as the second inflection point, i.e., the point where an increasing rate of voltage increase changes to a decreasing rate of voltage increase. Under the methodology of the Saar Patents, since the charger found the two inflection points, it would be enabled to stop charging soon thereafter, even though the battery pack has not been fully charged.

SUMMARY OF THE INVENTION

In accordance with the present invention, an improved battery charger method is employed. The charging method includes the steps of charging a battery pack, sensing voltage of the battery pack, calculating voltage change rate, detecting a first inflection point based on the voltage change rate so long as a voltage step is not detected, detecting a second inflection point based on the voltage change rate so long as a voltage step is not detected, and reducing current sent to the battery pack when both first and second inflection points have been detected.

Additional features and benefits of the present invention are described, and will be apparent from, the accompanying drawings and the detailed description below.

BRIEF DESCRIPTION OF THE DRAWINGS

The accompanying drawings illustrate preferred embodiments of the invention according to the practical application of the principles thereof, and in which.

DETAILED DESCRIPTION

The invention is now described with reference to the accompanying figures, wherein like numerals designate like parts. The teachings of the Saar Patents are wholly incorporated by reference.

Figure 6:
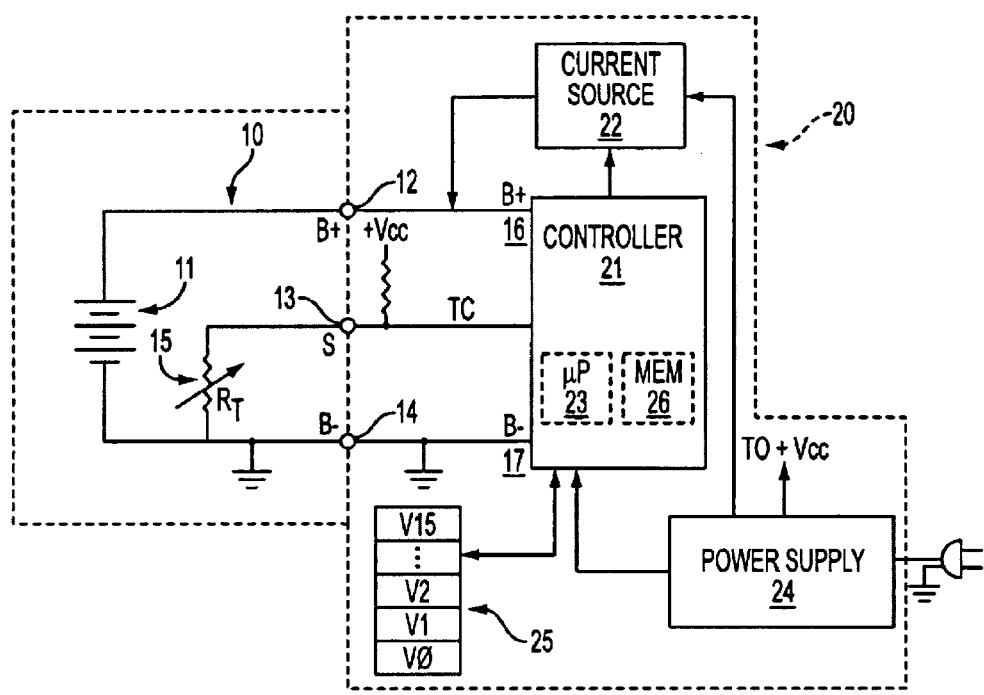
FIG. 6 is a circuit diagram of a battery pack and charger.

A typical battery pack and charger are shown in FIG. 6. In such figure, a battery pack 10 is connected to a charger 20. Battery pack 10 may comprise a plurality of battery cells 11 connected in series and/or parallel, which dictate the voltage and storage capacity for battery pack 10. Battery pack 10 may include three battery contacts: first battery contact 12, second battery contact 13, and third battery contact 14. Battery contact 12 is the B+ (positive) terminal for battery pack 10. Battery contact 14 is the B− or negative/common terminal. Battery contact 13 is the S or sensing terminal. Battery contacts 12 and 14 receive the charging current sent from the charger 20 (preferably from current source 22, as discussed below) for charging the battery pack 10.

As shown in FIG. 6, the battery cells 11 are connected between the battery contacts 12 and 14. In addition, preferably connected between battery contacts 13 and 14 is a temperature sensing device 15, such as a negative temperature co-efficient (NTC) resistor, or thermistor, $R_T$. The temperature sensing device is preferably in closer proximity to the cells 11 for monitoring of the battery temperature. Persons skilled in the art will recognize that other components, such as capacitors, etc., or circuits can be used to provide a signal representative of the battery temperature.

Battery pack 10 may also comprise an identifier as known in the prior art, so that charger 20 can identify the type and capacity of the battery pack, and charge accordingly.

The charger 20 preferably comprises a controller 21, which in turn includes positive terminal (B+) 16 and negative (B−) terminal 17, which are coupled to battery pack via battery contacts 12 and 14, respectively. The positive terminal may also act as an input, preferably an analog/digital input, in order for the controller 21 to detect the battery pack voltage. In addition, the controller 21 may include another input TC, preferably an analog/digital input, which is coupled to the temperature sensing device 15 via the third battery contact 13 (S). This allows the controller 21 to monitor the battery temperature.

Controller 21 may include a microprocessor 23 for controlling the charging and monitoring operations. Controller 21 may control a charging power source for providing power to the battery pack 10, such as current source 22 that provides current to battery pack 10. This current may be a fast charging current, an equalization current, and/or a maintenance current. Current source 22 may be integrated within controller 21.

Controller 21 may also include a memory 26 for storing data. Memory 26 may be integrated within controller 21 and/or microprocessor 23.

Controller 21 may also include a memory stack 25 for storing data. Preferably, the memory stack 25 will be a first-in-first-out (FIFO) data stack, which is used to store battery voltage data, as explained below. Stack 25 preferably has sufficient space for storing 16 values. Stack 25 may be integrated within controller 21 and/or microprocessor 23.

The charger 20, and its elements within, including controller 21, microprocessor 23, and current source 22, receive the necessary power from a power supply 24, which may be connected to a vehicle battery, a generator, or an AC outlet. Power supply 24 may convert the power received from the vehicle battery, the generator, or the AC outlet to the necessary power requirements of the different elements, as is well known in the art.

Basically, in order to avoid improper termination of the charging process due to voltage step C, it is preferable to provide the charge process of the Saar Patents with a method for detecting a voltage step and then correcting the stored data so that the controller 21 does not register a false inflection point.

Figure 1:
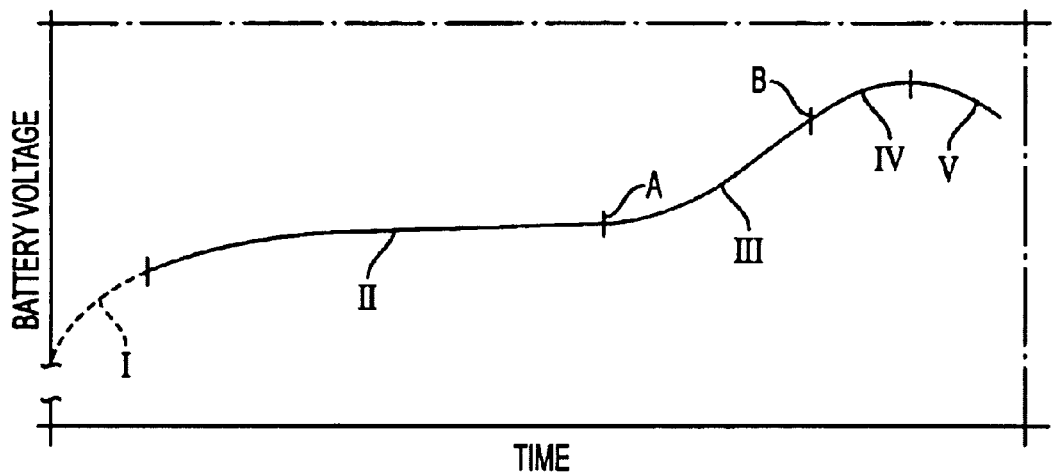
FIG. 1 is a graph illustrating the variation of voltage as a function of time during the charge cycle of a nickel-cadmium battery pack.
Figure 2:
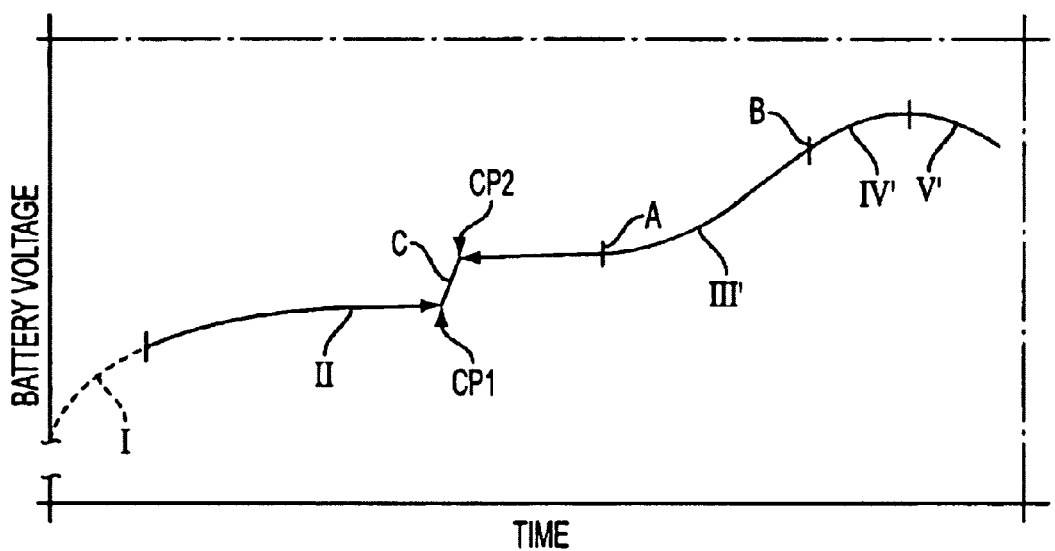
FIG. 2 is a graph illustrating the variation of voltage as a function of time during the charge cycle of a nickel-cadmium battery pack where a voltage step occurs.
Figure 3:
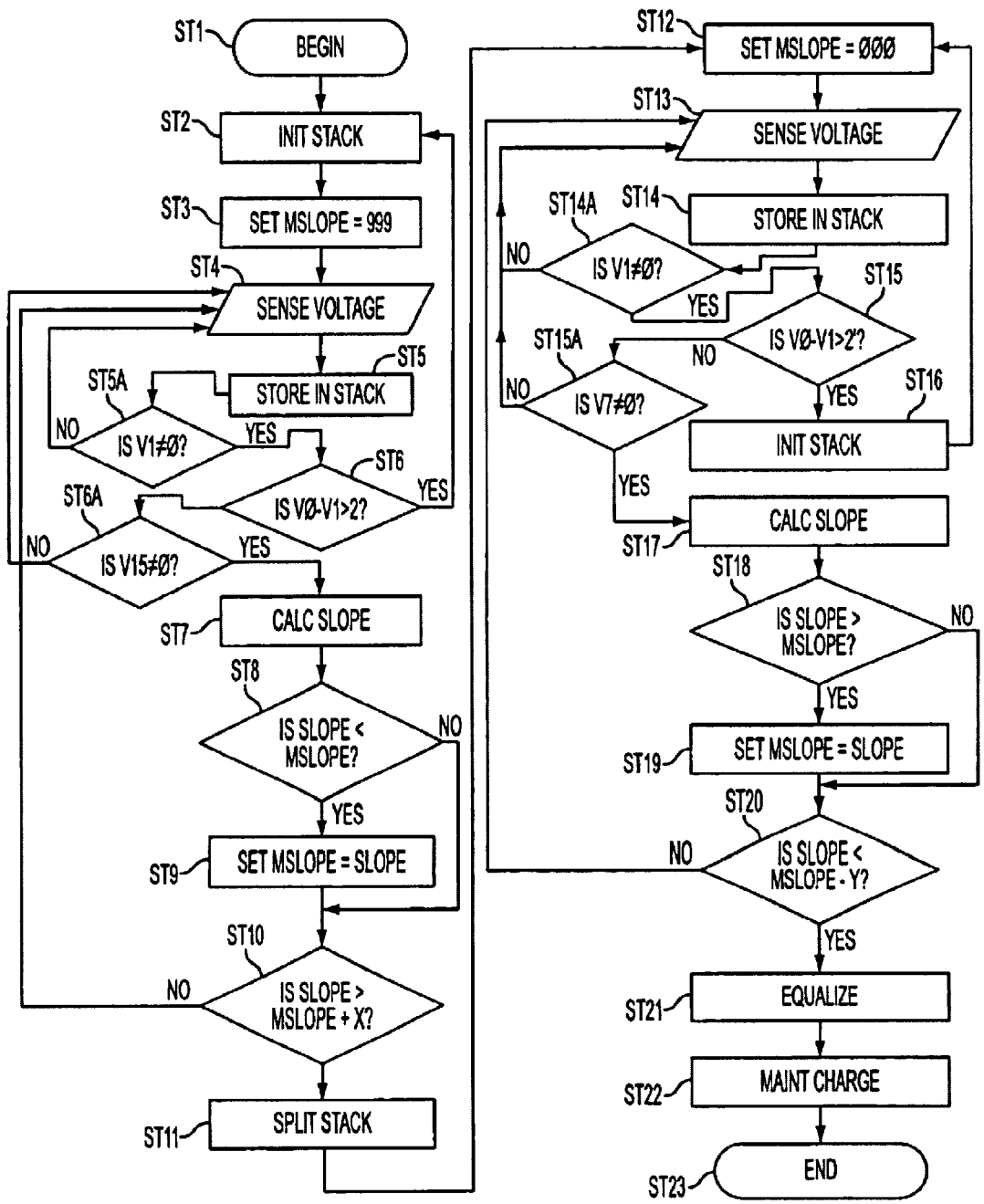
FIG. 3 is a flowchart of the charging process according to the present invention.

FIG. 3 illustrates one implementation of such process. Persons skilled in the art will recognize that the order of the steps discussed below may be altered.

The charging process begins upon insertion of a battery pack into a charger by the user (ST1). Accordingly, a fast charge current is sent from current source 22 to battery pack 10. Preferably, the fast charge current is about 2.5 Amps.

While current is sent to the battery pack 10, memory stack 25 is initialized (ST2). Accordingly, all memory slots in stack 25 may be set to zero.

In addition, a variable MSLOPE, which may be stored in memory 26, may be set to a high number, such as 999, etc. (ST3). As discussed below, MSLOPE may represent either the minimum or maximum slopes of the voltage curve at different times in the charging process.

As mentioned above, the controller 21 may sense the battery pack voltage (ST4). This may be accomplished via positive terminal B+. The sensed voltage is then stored in the stack 25 (ST5). These two steps may be performed several times at the beginning of the charging process in order to load up the stack 25 with voltage values.

The controller 21 then may check whether the second most recent voltage value (VI) stored in the stack 25 is equal (or not equal) to zero (ST5A). If VI is zero, then controller 21 may need to sense yet another voltage value (ST4) and store it in the stack 25 (ST5).

The controller 21 then may compare the most recent voltage value (VO) to the second most recent voltage value (VI) stored in the stack 25 (ST6). If the difference between the two voltage readings is larger than a predetermined threshold Z, then a voltage step has occurred.

Persons skilled in the art will recognize that the compared voltage may not necessarily be in volts, e.g., 2.3 volts, etc. Because the voltage values may be read through an analog-to-digital input, the voltage values will be represented as A/D counts.

The equivalence between A/D counts and volts will be determined by factors such as the size of the analog-to-digital input (10-bit vs. 12-bit), etc. Persons skilled in the art will know how to determine such equivalence as related to their actual device.

Persons skilled in the art will also recognize that the threshold Z should be selected so that it is high enough to avoid false triggering due to the normal charging curve, and low enough to recognize a voltage step. Accordingly, threshold Z should be set to be between the value of one cell (on or about 1.0 volts to on or about 1.4 volts) and one-third of the value of such cell (on or about 0.33 volts). Preferably, threshold Z should be set to be about 0.50 volts.

Providing a threshold Z that is lower than the value of one cell is advantageous since it would allow recognition of a voltage step even if the battery pack voltage is sensed while the voltage step occurs. In other words, if the controller 21 measures the battery pack voltage halfway through the voltage step, it will find a jump in battery pack voltage of about 0.50 volts, rather than 1.4 volts. By setting the threshold Z low enough, the controller 21 would recognize such voltage jump as a voltage step.

If a voltage step is recognized, the stack 25 is preferably initialized to zeros and MSLOPE is preferably set to a high value (ST2, ST3). Accordingly, the sensing begins anew to prevent controller 21 from recognizing a first inflection point. Persons skilled in the art may recognize that controller 21 may drive a display (not shown) to show an error message and/or to indicate that the battery pack 10 may be defective.

If a voltage step is not recognized, controller 21 may check whether the least recent voltage value (V15) stored in the stack 25 is equal (or not equal) to zero (ST6A). If V15 is zero, then controller 21 may need to sense yet another voltage value (ST4) and store it in the stack 25 (ST5).

If V15 is not zero, then the entire stack 25 is full. The slope of the voltage curve may then be calculated (ST7). Persons skilled in the art will recognize that such slope can be calculated in different manners. One such manner is comparing the total of the eight most recent voltage readings in stack 25 with the total of the eight least recent voltage readings in stack 25. In other words, $$\text{SLOPE}=(V0+V1+V2+V3+\ldots+V7)-(V8+V9+V10+V11+\ldots+V15).$$

Such algorithm is less susceptible to noise since it in effect averages out the readings by calculating the slope over a longer period of time, rather than if the slope was calculated based on two immediate readings.

After calculating the slope, the controller 21 may compare the calculated slope with MSLOPE (ST8). If the slope is smaller than MSLOPE, then MSLOPE is set to be equal to the calculated slope (ST9). In this manner, MSLOPE in effect keeps track of the smallest (or minimum) slope.

Regardless of whether the calculated slope is smaller than MSLOPE, the controller 21 may check whether the calculated slope is equal to and/or larger than the sum of MSLOPE with a predetermined threshold X (ST10). If not, the controller 21 continues charging and sensing the battery pack voltage (ST4).

However, if the calculated slope is equal to and/or larger than the sum of MSLOPE with a predetermined threshold X, this is interpreted to be the first inflection point A, i.e., the point in the voltage curve where the decreasing rate of voltage increase changes to an increasing rate of voltage increase.

Persons skilled in the art will recognize that threshold X is preferably determined empirically. In the preferred embodiment, threshold X is set to be 20 A/D counts for a 10-bit A-to-D converter, which is equivalent to about 33 mV/minute. Alternatively, threshold X may be set to be 45 A/D counts for a 12-bit A-to-D converter, which is equivalent to about 24 mV/minute. Persons skilled in the art will recognize that different values may be set instead of these.

Because of the rapid voltage increases in the next portion of the voltage curve, it is preferable to accelerate the slope calculations. This may be accomplished by using less voltage readings in the slope calculation, as discussed below. Accordingly, the controller 21 may "split" stack 25, so that instead of using all sixteen slots, it uses only eight (ST11). Alternatively, stack 25 may not be necessarily split. Instead, controller 21 just ignores the eight oldest stored voltage values.

In addition, controller 21 may set MSLOPE to zero (ST12), so that MSLOPE can store the largest (or maximum) slope.

As before, the controller 21 may sense the battery pack voltage (ST13). This may be accomplished via positive terminal B+. The sensed voltage is then stored in the stack 25 (ST14).

The controller 21 may check whether the second most recent voltage value (V1) stored in the stack 25 is equal (or not equal) to zero (ST14A). If V1 is zero, then controller 21 may need to sense yet another voltage value (ST13) and store it in the stack 25 (ST14).

If V1 is not zero, the controller 21 then may compare the most recent voltage value (V0) to the previous voltage value (V1) stored in the stack 25 (ST15). If the difference between the two voltage readings is larger than a predetermined threshold Z', then a voltage step has occurred. Preferably, threshold Z' in this step is equal to threshold Z in ST6, and that the same guidelines discussed above would apply here. However, persons skilled in the art will recognize that this need not be so.

If a voltage step is recognized, the stack 25 is preferably initialized with zeros (ST16) and MSLOPE is preferably set to zero (ST12). Accordingly, the sensing begins anew to prevent controller 21 from recognizing a second inflection point. Persons skilled in the art may recognize that controller 21 may drive a display (not shown) to show an error message and/or to indicate that the battery pack 10 may be defective.

If a voltage step is not recognized, controller 21 may check whether the least recent voltage value (V7) stored in the stack 25 is equal (or not equal) to zero (ST15A). If V7 is zero, then controller 21 may need to sense yet another voltage value (ST13) and store it in the stack 25 (ST14).

If V7 is not zero, then stack 25 is completely filled with voltage values. The slope of the voltage curve may then be calculated (ST17). Persons skilled in the art will recognize that such slope can be calculated in different manners. One such manner is comparing the total of the four most recent voltage readings in stack 25 with the total of the four least recent voltage readings in stack 25. In other words, $$SLOPE=(V0+V1+V2+V3)-(V4+V5+V6+V7).$$

After calculating the slope, the controller 21 may compare the calculated slope with MSLOPE (ST18). If the slope is larger than MSLOPE, then MSLOPE is set to be equal to the calculated slope (ST19). In this manner, MSLOPE in effect keeps track of the largest (or maximum) slope.

Regardless of whether the calculated slope is larger than MSLOPE, the controller 21 may check whether the calculated slope is equal to and/or smaller than the difference between MSLOPE and a predetermined threshold Y (ST20). If not, the controller 21 continues charging and sensing the battery pack voltage (ST13).

However, if the calculated slope is equal to and/or smaller than the difference between MSLOPE and a predetermined threshold Y, this is interpreted to be the second inflection point B, i.e., the point in the voltage curve where the increasing rate of voltage increase changes to a decreasing rate of voltage increase.

Persons skilled in the art will recognize that threshold Y is preferably determined empirically. In the preferred embodiment, threshold X is set to be 3 A/D counts for a 10-bit A-to-D converter, which is equivalent to about 20 mV/minute. Alternatively, threshold X may be set to be 7 A/D counts for a 12-bit A-to-D converter, which is equivalent to about 13 mV/minute. Persons skilled in the art will recognize that different values may be set instead of these.

Figure 4:
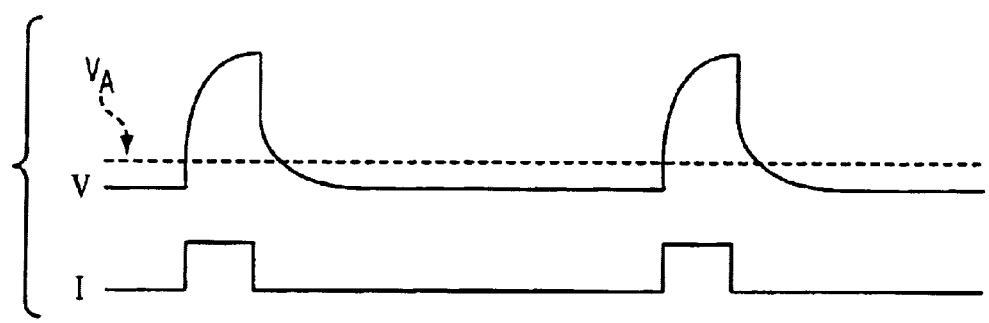
FIG. 4 is a graph illustrating the variations of voltage and current as a function of time during the equalization portion of the charging process.

Because two inflection points have thus been found, the charger 20 may then stop the fast current charge and begin the equalization charge (ST<)). Such step helps in equalizing the voltage of all the cells 11 in battery pack 10. Preferably, the current source 22 is pulsed so that it does not send the full current into battery pack 10. FIG. 4 illustrates the current pulses and the effect on battery voltage. The lengths of the periods where the current is on and off are selected in order to provide battery pack 10 the desired output current according to the following equation:

$$I_O=(t_{ON}/(t_{ON}+t_{OFF}))\ I, \text{where}$$

$I_O$ is the effective output current to the battery pack 10, $t_{ON}$ is the on-time of the current pulse, $t_{OFF}$ is the off-time of the current pulse, i.e., the remainder of the period, and I is the current source amperage prior to pulsing.

Accordingly, in a 2.5 A charger (i.e., I=2.5A), if $t_{ON}$ and $t_{OFF}$ are 1 second and 24 seconds, respectively, the effective output current will be 100 mA. Typically, the effective output current is between 83 mA and 100 mA. In addition, such current pulsing will continue for a predetermined period of time, usually about 2 hours.

When such predetermined period of time has elapsed, it is preferable to enter a maintenance charge stage (ST22). The purpose of this stage is to maintain the battery pack 10 charged until it is removed from the charger 20. In this stage, current is once again pulsed to the battery pack 10 so that current source 22 does not send the full current into battery pack 10.

It has been found that the battery pack 10 may be damaged if the equalization stage current pulsing is continued indefinitely. As shown in FIG. 4, the battery voltage increases when the battery pack 10 receives the current pulse. Because of the long on-time of the current pulse, the battery pack voltage rapidly climbs way above the voltage average $V_A$, shown in broken lines. This may create a breakdown in the cells over time.

Figure 5:
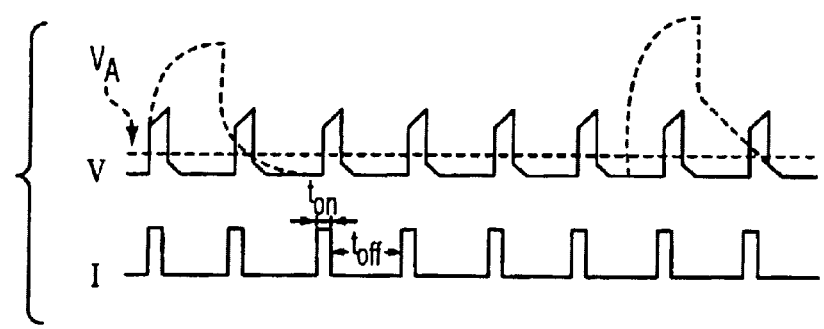
FIG. 5 is a graph illustrating the variations of voltage and current as a function of time during the maintenance portion of the charging process.

Accordingly, it is desirable to shorten the on-time of the current pulses so that the battery pack voltage do not climb as much. As shown in FIG. 5, the shorter current pulses do not cause the battery voltage to climb as much as in the equalization stage (the voltage peaks in the equalization stage are shown in broken lines).

Preferably, the on- and off-times of the current period are manipulated so that output current is kept between around 1 mA and around 100 mA. However, the periods cannot be made too small, as this creates problems with the inductance, etc.

Accordingly, it has been found that the preferred range of current pulse on-times is between about 5 ms and about 250 ms. Persons skilled in the art will know to use the equation discussed in paragraph 0078 in order to calculate the appropriate off-time in order to obtain the desired output current. Preferably, the on- and off-times are 10 ms and 240 ms, respectively, for a 2.5 Amp charger.

Accordingly, such maintenance stage pulsing can continue indefinitely without damage to the battery pack 10. The charging process can then end (ST23) when the battery pack 10 is removed from charger 20, or after a predetermined period of time has elapsed.

Persons skilled in the art may recognize other additions or alternatives to the means disclosed herein. However, all these additions and/or alterations are considered to be equivalents of the present invention.

What is claimed is:

1. A method for charging batteries comprising the steps of:

providing a current source for providing current to a battery pack during a fast charge cycle, the current source having an amperage rating;

after the fast charge cycle, commencing an equalization cycle comprising repeatedly pulsing the current source to provide a pulsed current to the battery pack, wherein a pulse of such pulsed current has an on-time having a first predetermined period of time and an off-time having a second predetermined period of time, the battery pack not being discharged between pulses of such pulsed current;

wherein the first predetermined period of time is between about 5 milliseconds and 250 milliseconds, and the second predetermined period of time is determined by the following equation:

$$t_{OFF}=t_{ON}\ (I/I_O)-t_{ON}, \text{where}$$

$I_O$ is the effective output current of the pulsed current $t_{ON}$ is the first predetermined period of time, $t_{OFF}$ is the second predetermined period of time, and I is the amperage rating of the current source.

2. The method of claim 1, wherein value of the effective output current of the pulsed current is between around 1 milliamp and around 100 milliamp.

3. The method of claim 2, wherein the amperage rating of the current source is about 2.5 amps.

4. The method of claim 1, wherein the first predetermined period of time is about 10 milliseconds.

5. The method of claim 4, wherein the second predetermined period of time is about 240 milliseconds.

6. The method of claim 4, wherein the amperage rating of the current source is about 2.5 amps.

7. The method of claim 1, wherein the second predetermined period of time is about 240 milliseconds.

8. The method of claim 7, wherein the amperage rating of the current source is about 2.5 amps.

9. The method of claim 7, wherein the first predetermined period of time is about 10 milliseconds.

* * * * *